(12) United States Patent
Hwang et al.

(10) Patent No.: US 8,977,040 B2
(45) Date of Patent: Mar. 10, 2015

(54) METHOD AND APPARATUS TO GENERATE OBJECT DESCRIPTOR USING EXTENDED CURVATURE GABOR FILTER

(75) Inventors: Won Jun Hwang, Suwon-si (KR); Kyung Shik Roh, Seongnam-si (KR); Suk June Yoon, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 655 days.

(21) Appl. No.: 13/204,933

(22) Filed: Aug. 8, 2011

(65) Prior Publication Data
US 2012/0063673 A1 Mar. 15, 2012

(30) Foreign Application Priority Data
Sep. 9, 2010 (KR) .................. 10-2010-0088336

(51) Int. Cl.
| | |
|---|---|
| G06K 9/46 | (2006.01) |
| G06K 9/54 | (2006.01) |
| G06K 9/62 | (2006.01) |
| G06K 9/60 | (2006.01) |
| G06F 17/30 | (2006.01) |

(Continued)

(52) U.S. Cl.
CPC ............. *G06K 9/4619* (2013.01); *G06T 7/402* (2013.01); *G06K 9/6234* (2013.01); *G06K 9/00268* (2013.01); *G06T 2207/30201* (2013.01); *G06T 2207/20081* (2013.01)
USPC ..... 382/159; 382/203; 382/305; 707/E17.025

(58) Field of Classification Search
CPC .................... G06K 9/4619; G06T 2207/20048
See application file for complete search history.

(56) References Cited

U.S. PATENT DOCUMENTS

| | | | | |
|---|---|---|---|---|
| 6,466,695 | B1 * | 10/2002 | Potzsch et al. | 382/199 |
| 2007/0172099 | A1 * | 7/2007 | Park et al. | 382/118 |
| 2008/0107311 | A1 | 5/2008 | Huang et al. | |

(Continued)

FOREIGN PATENT DOCUMENTS

| | | |
|---|---|---|
| JP | 2005-44330 | 2/2005 |
| KR | 10-2008-0041931 | 5/2008 |

OTHER PUBLICATIONS

Su, Yu, et al. "Hierarchical ensemble of global and local classifiers for face recognition." Image Processing, IEEE Transactions on 18.8 (2009): 1885-1896.*

(Continued)

*Primary Examiner* — Randolph I Chu
*Assistant Examiner* — Nathan Bloom
(74) *Attorney, Agent, or Firm* — Harness, Dickey & Pierce, P.L.C.

(57) ABSTRACT

A method and apparatus to generate an object descriptor using extended curvature gabor filters. The method and apparatus may increase a recognition rate of even a relatively small image with use of an extended number of curvature gabor filters having controllable curvatures and may reduce the amount of calculation required for face recognition by performing the face recognition using only some of the extended curvature gabor filters which have a great effect on the recognition rate. The object descriptor generating method includes extracting gabor features from an input object image by applying a plurality of curvature gabor filters, generated via combination of a plurality of curvatures and a plurality of Gaussian magnitudes, to the object image, and generating an object descriptor for object recognition by projecting the extracted features onto a predetermined base vector.

19 Claims, 7 Drawing Sheets

(A)

(B)

(51) Int. Cl.
*G06T 7/40* (2006.01)
*G06K 9/00* (2006.01)

(56) References Cited

U.S. PATENT DOCUMENTS

| 2009/0028444 | A1* | 1/2009 | Hwang et al. | 382/224 |
| 2010/0232657 | A1* | 9/2010 | Wang | 382/118 |
| 2011/0135166 | A1* | 6/2011 | Wechsler et al. | 382/118 |
| 2012/0155718 | A1* | 6/2012 | Hwang et al. | 382/118 |
| 2013/0108123 | A1* | 5/2013 | Hwang et al. | 382/118 |

OTHER PUBLICATIONS

Andrea F. Abate, Michele Nappi, Daniel Riccio, Gabriele Sabatino, 2D and 3D face recognition: A survey, Pattern Recognition Letters, vol. 28, Issue 14, Oct. 15, 2007, pp. 1885-1906, ISSN 0167-8655.*

Shufu Xie, Shiguang Shan, Xilin Chen, Xin Meng, Wen Gao, Learned local Gabor patterns for face representation and recognition, Signal Processing, vol. 89, Issue 12, Dec. 2009, pp. 2333-2344, ISSN 0165-1684.*

Di Huang; Caifeng Shan; Ardabilian, M.; Yunhong Wang; Liming Chen, "Local Binary Patterns and Its Application to Facial Image Analysis: A Survey," Systems, Man, and Cybernetics, Part C: Applications and Reviews, IEEE Transactions on , vol. 41, No. 6, pp. 765,781, Nov. 2011.*

Arar, N.M.; Hua Gao; Ekenel, H.K.; Akarun, L., "Selection and combination of local Gabor classifiers for robust face verification," Biometrics: Theory, Applications and Systems (BTAS), 2012 IEEE Fifth International Conference on , vol., no., pp. 297,302, Sep. 23-27, 2012.*

Extended European Search Report issued Mar. 28, 2014 in corresponding European Patent Application No. 11177890.8.

J.M.H. du Buf "Chapter 9. From semantic texture attributes to a syntactic analysis in Gabor space" 2006; XP-002721492; pp. 139-140.

Norbert Krüger et al. "Object Recognition with Banana Wavelets", Apr. 16, 1997; XP-055106740; pp. 61-66.

* cited by examiner (A)

(B)

(A)

(B)

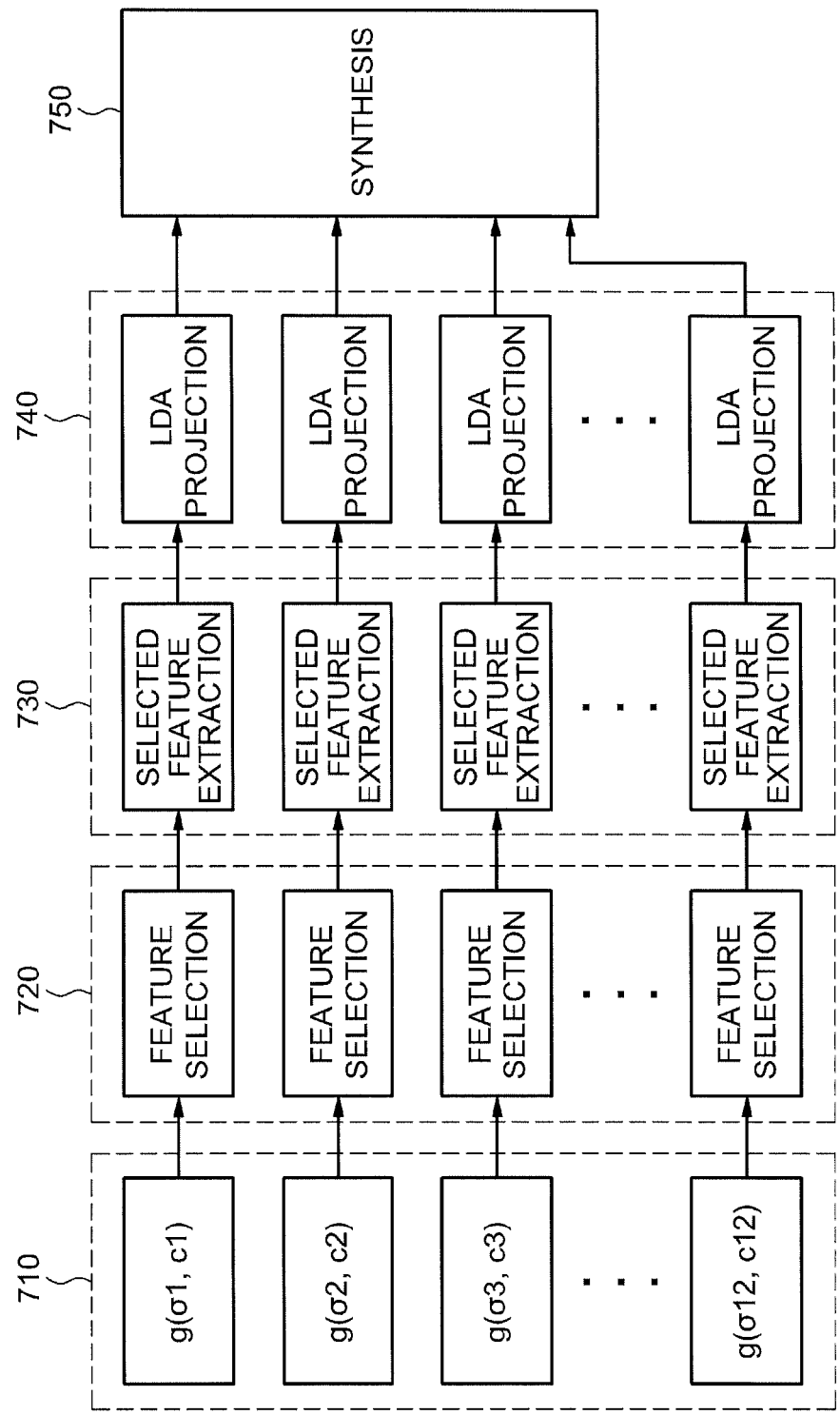

METHOD AND APPARATUS TO GENERATE OBJECT DESCRIPTOR USING EXTENDED CURVATURE GABOR FILTER

CROSS-REFERENCE TO RELATED APPLICATIONS

This application claims the benefit of Korean Patent Application No. 2010-0088336, filed on Sep. 9, 2010 in the Korean Intellectual Property Office, the disclosure of which is incorporated herein by reference.

BACKGROUND

1. Field

Embodiments relate to a method and apparatus to generate an object descriptor using curvature gabor filters.

2. Description of the Related Art

The importance of security using face recognition is gradually increasing due to the recent prevalence of terrorism and information theft. Establishing a biometric recognition solution to prevent terrorism is interesting. A representative effective method to counteract terrorism is to reinforce border security and identity verification. The international Civil Aviation Organization (ICAO) has recommended that biometric recognition information be used by a mechanical travel document reader. The Enhanced Border Safety and Visa Entry Reform Act of the U.S. provides for an enhanced introduction level of biometric identifiers and associated software and mandates the use of biometric recognition information in travel documents, passports, and U.S. visas. Biometric passports have been adopted by several nations, such as some European countries, the United States, and Japan. In addition, a new type of biometric passport incorporating a chip in which biometric information of a user is stored has ever been used.

Many agencies, companies, and other types of organizations demand that their employees or visitors use admission cards for identifying individuals today. Accordingly, each employee or visitor may need to always carry a key card or a key pad for use with a card reader when he or she stays in a designated admission allowed area.

However, if the employee or visitor losses or is robbed of the key card or the key pad, serious security problems, such as invasion of an unauthenticated person into a restricted area, may occur. To prevent the security problem, biometric recognition systems to automatically recognize and verify personal identities using human biometric information or behavior characteristics have been developed. These biometric recognition systems have been used in banks, airports, and other high-security facilities, and more simplified and highly reliable biometric recognition systems have also been studied.

Personal features used by the biometric recognition systems include fingerprints, face shape, handprints, hand shape, thermal images, voice, signature, venous shape, typing keystroke dynamics, retina, iris, etc. Face recognition is the most frequently used personal identification technique to verify a personal identify from one or more faces present in a still image or a moving image using a given facial database. Facial image data may greatly vary depending on poses or illumination and therefore, it may be difficult to classify various pieces of pose data of the same person into the same class.

Although various image processing methods to reduce errors in face recognition have been recommended, these methods may result in errors caused by assumption of linear distribution and assumption of Gaussian distribution when attempting to recognize a face.

In particular, a gabor wavelet filter, which has been used in face recognition, is suitable to capture various changes, such as expression change and illumination change in a facial image, but may necessitate complex calculation processes when face recognition is performed using gabor wavelet features. Parameters of the gabor wavelet filter are restrictive. The use of the gabor wavelet filter having these restrictive characteristics may increase occurrence probability of errors in face recognition and deteriorate a recognition rate in face recognition. In particular, when expression change and illumination change in a facial image are significant, the recognition rate may be further deteriorated.

SUMMARY

Therefore, it is an aspect of embodiments to increase a recognition rate of even a relatively small image with use of an extended number of curvature gabor filters having controllable curvatures and to reduce the amount of calculation required for face recognition by performing the face recognition using only some of the extended curvature gabor filters which have a great effect on the recognition rate.

Additional aspects of embodiments will be set forth in part in the description which follows and, in part, will be obvious from the description, or may be learned by practice of the embodiments.

In accordance with an aspect of an embodiment, a method of generating an object descriptor includes extracting gabor features from an input object image by applying a plurality of curvature gabor filters, generated via combination of a plurality of curvatures and a plurality of Gaussian magnitudes, to the object image, and generating an object descriptor for object recognition by projecting the extracted features onto a predetermined base vector.

The curvatures may be in the range of a value equal to or greater than about 0.0 to a value equal to or less than about 0.2, and the Gaussian magnitudes may be in the range of a value equal to or greater than about $0.5\pi$ to a value equal to or less than about $2\pi$.

The curvatures may be represented by c={0.0, 0.05, 0.1, 0.2}, and the Gaussian magnitudes may be represented by $\sigma$={$0.5\pi$, $\pi$, $2\pi$}.

When the plurality of gabor filters are arranged in columns on the basis of the curvatures and in rows on the basis of the Gaussian magnitudes, the gabor features may be extracted using some of the gabor filters which are arranged in a T-shaped form.

The filters arranged in a T-shaped form may include filters having the Gaussian magnitude $\sigma$={$0.5\pi$, $\pi$, $2\pi$} based on the curvature c={0.0}, and filters having the Gaussian magnitude $\sigma$={$\pi$} based on the curvature c={0.05, 0.1, 0.2}.

The object descriptor generating method may further include extracting gabor features from a training object image by applying the curvature gabor filters to the training object image, and selecting gabor features by performing boosting learning for object image classification with respect to the extracted gabor features, and establishing a gabor feature set including the selected gabor features, and the extraction of the gabor features may include extracting gabor features by applying curvature gabor filters having the established gabor feature set to the input object image.

The object descriptor generating method may further include generating a base vector by performing linear discriminant analysis of the established gabor feature set, and the generation of the object descriptor may include generating an object descriptor for object recognition by projecting the extracted gabor features onto the generated base vector.

In accordance with another aspect of an embodiment, a method of generating an object descriptor includes extracting first gabor features from a training object image by applying curvature gabor filters to the training object image, selecting gabor features by performing boosting learning for object image classification with respect to the extracted gabor features and establishing a gabor feature set including the selected gabor features, generating a base vector by performing linear discriminant analysis of the established gabor feature set, extracting second gabor features from an input object image by applying a plurality of curvature gabor filters, generated via combination of a plurality of curvatures and a plurality of Gaussian magnitudes among the established gabor feature set, to the input object image, and generating an object descriptor for object recognition by projecting the extracted second gabor features onto the generated base vector.

The curvatures may be in the range of a value equal to or greater than about 0.0 to a value equal to or less than about 0.2, and the Gaussian magnitudes may be in the range of a value equal to or greater than about $0.5\pi$ to a value equal to or less than about $2\pi$.

The curvatures may be represented by c={0.0, 0.05, 0.1, 0.2}, and the Gaussian magnitudes may be represented by $\sigma$={$0.5\pi$, $\pi$, $2\pi$}.

When the plurality of gabor filters are arranged in columns on the basis of the curvatures and in rows on the basis of the Gaussian magnitudes, the gabor features may be extracted using some of the gabor filters which are arranged in a T-shaped form.

The filters arranged in a T-shaped form may include filters having the Gaussian magnitude $\sigma$={$0.5\pi$, $\pi$, $2\pi$} based on the curvature c={0.0}, and filters having the Gaussian magnitude $\sigma$={$\pi$} based on the curvature c={0.05, 0.1, 0.2}.

In accordance with a further aspect of an embodiment, an apparatus of generating an object descriptor includes a first feature extractor to extract gabor features from an input object image by applying a plurality of curvature gabor filters, generated via combination of a plurality of curvatures and a plurality of Gaussian magnitudes, to the object image, and an object descriptor generator to generate an object descriptor for object recognition by projecting the extracted features onto a predetermined base vector.

The curvatures may be in the range of a value equal to or greater than about 0.0 to a value equal to or less than about 0.2, and the Gaussian magnitudes may be in the range of a value equal to or greater than about $0.5\pi$ to a value equal to or less than about $2\pi$.

The curvatures may be represented by c={0.0, 0.05, 0.1, 0.2}, and the Gaussian magnitudes may be represented by $\sigma$={$0.5\pi$, $\pi$, $2\pi$}.

When the plurality of gabor filters are arranged in columns on the basis of the curvatures and in rows on the basis of the Gaussian magnitudes, the gabor features may be extracted using some of the gabor filters which are arranged in a T-shaped form.

The filters arranged in a T-shaped form may include filters having the Gaussian magnitude $\sigma$={$0.5\pi$, $\pi$, $2\pi$} based on the curvature c={0.0}, and filters having the Gaussian magnitude $\sigma$={$\pi$} based on the curvature c={0.05, 0.1, 0.2}.

The object descriptor generating apparatus may further include a second feature extractor to extract gabor features from a training object image by applying the curvature gabor filters to the training object image, and a selector to select gabor features by performing boosting learning for object image classification with respect to the gabor features extracted from the second feature extractor and to establish a gabor feature set including the selected gabor features, and the first feature extractor may extract gabor features by applying curvature gabor filters having the established gabor feature set to the input object image.

The object descriptor generating apparatus may further include generating a base vector generator to generate a base vector by performing linear discriminant analysis of the established gabor feature set, and the object descriptor generator may generate an object descriptor for object recognition by projecting the gabor features, extracted from the first feature extractor, onto the generated base vector.

BRIEF DESCRIPTION OF THE DRAWINGS

These and/or other aspects of embodiments will become apparent and more readily appreciated from the following description of the embodiments, taken in conjunction with the accompanying drawings of which:

FIG. 7 is a view illustrating an object descriptor generating sequence when using extended curvature gabor filters having various curvatures according to an embodiment.

DETAILED DESCRIPTION

Figure 1:
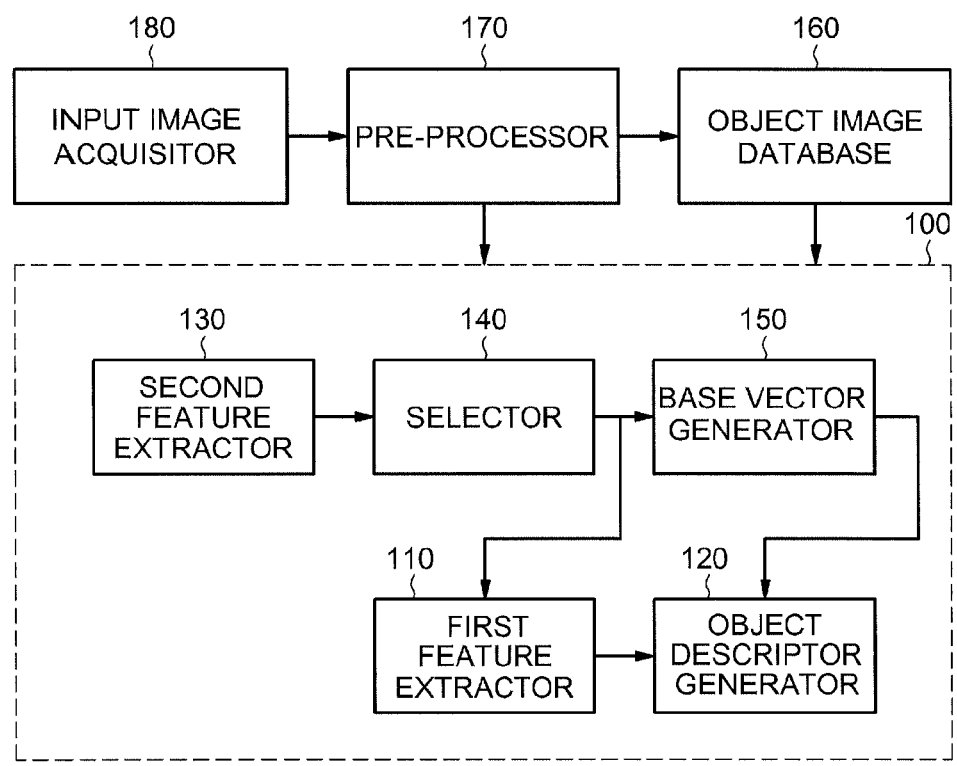
FIG. 1 is a schematic view illustrating an object descriptor generating apparatus according to an embodiment.

Reference will now be made in detail to embodiments, examples of which are illustrated in the accompanying drawings, wherein like reference numerals refer to like elements throughout.

FIG. 1 is a schematic view illustrating an object descriptor generating apparatus according to an embodiment.

As illustrated in FIG. 1, the object descriptor generating apparatus 100 includes a first feature extractor 110, an object descriptor generator 120, a second feature extractor 130, a selector 140, and a base vector generator 150. Here, the first feature extractor 110 and the object descriptor generator 120 are components to generate an object descriptor with respect to an input object image, and the second feature extractor 130, the selector 140 and the base vector generator 150 are components to learn an object image stored in a predetermined database. Specifically, the learning components 130, 140 and 150 serve to find an optimal combination of extended curvature gabor filters and generate a base vector having a good classification rate of features found from the optimal combination. The object descriptor generating components 110 and 120 serve to generate an object descriptor for describing an input object image by extracting features from the input object image using parameters and positions of the optimal curvature gabor filters found by the learning components and projecting the extracted features onto the base vector generated by the learning components.

An object image database 160 stores images for object recognition or identity identification. For example, in the case of face recognition, the object image database 160 may store information about a plurality of facial images having various facial expressions, angles, and brightness values in order to increase face recognition efficiency. An image preprocessor 170 performs predetermined preprocessing of an input object image or an image before it is stored in the database. For example, the image preprocessor 170 removes a background portion from an input image, adjusts the magnitude of the image on the basis of an eye position, and thereafter, modifies the facial image through a pre-processing process for decreasing a dispersion degree of lighting to make the facial image be suitable for generation of a face descriptor. An input image acquisitor 180 acquires an input object image for object recognition. For example, the input image acquisitor 180 acquires an object image or a human facial image for object recognition or identity verification using a camera or a camcorder. The object image database 160, the image preprocessor 170, and the input image acquisitor 180 may be provided separately from the object descriptor generating apparatus 100, or may be integrated with the object descriptor generating apparatus 100 to define a single apparatus.

Figure 2:
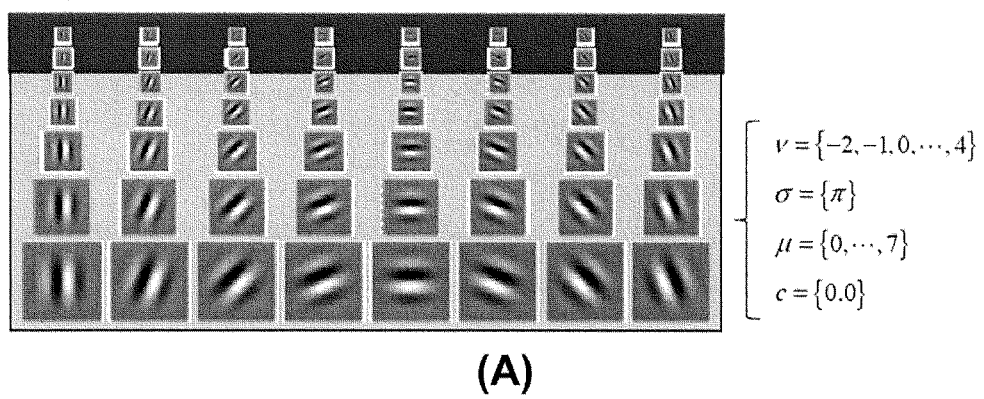
FIGS. 2(A) and 2(B) are views describing characteristics of extended curvature gabor filters according to an embodiment.
Figure 2:
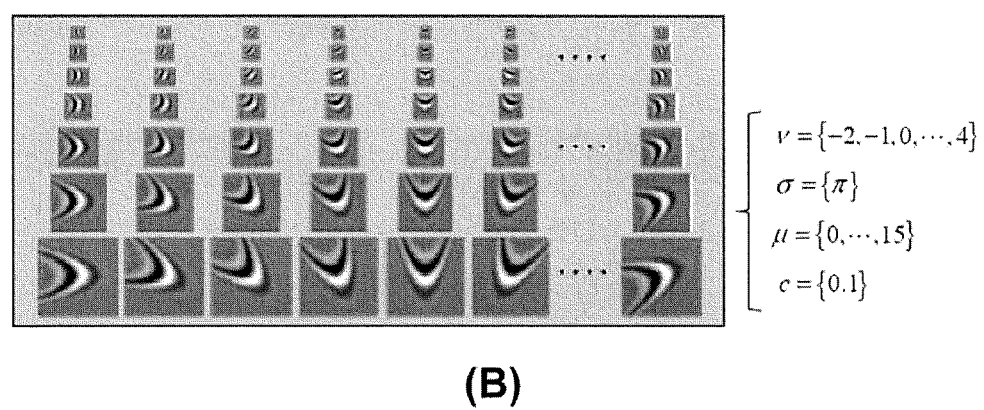
Figure 3:
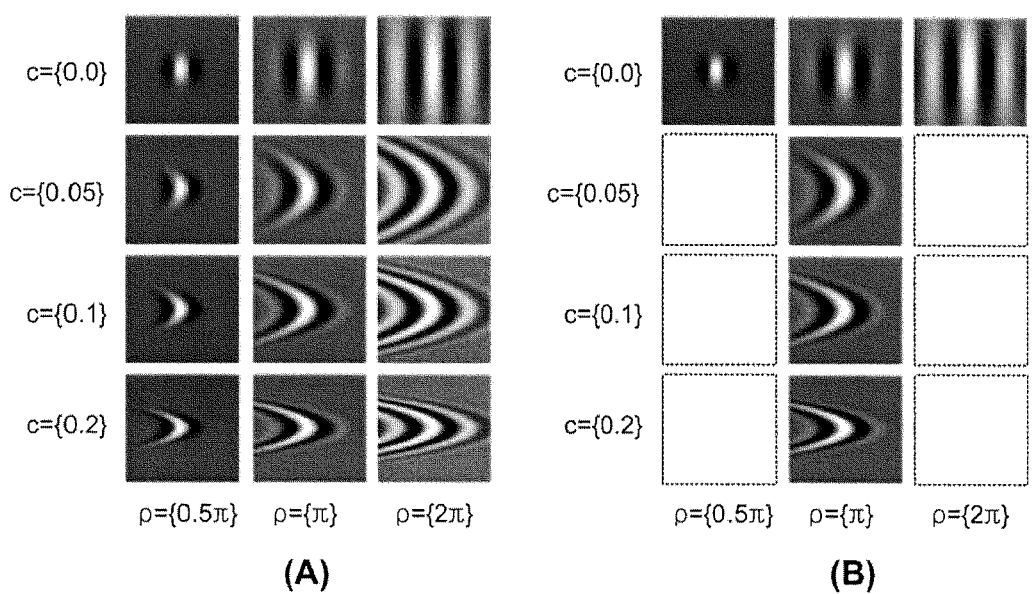
FIGS. 3(A) and 3(B) are views describing extended curvature gabor filters having various curvatures according to an embodiment.
Figure 4:
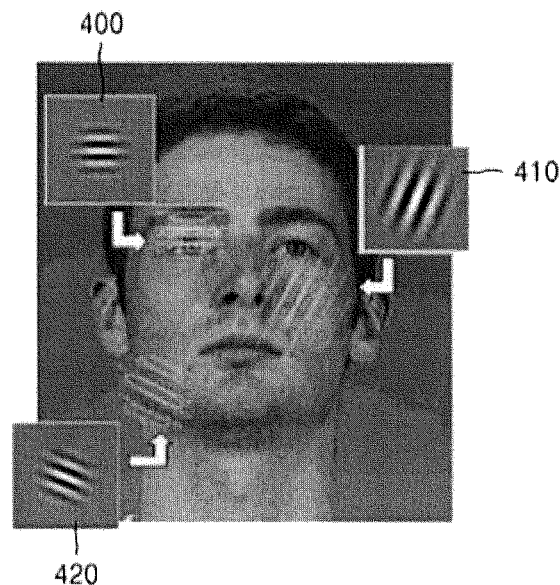
FIGS. 4(A) and 4(B) are views describing an example of applying curvature gabor filters to a facial image according to an embodiment.
Figure 4:
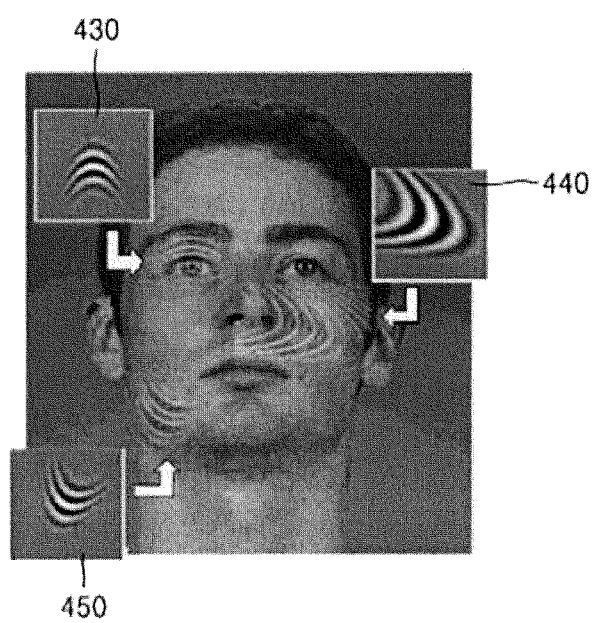

In the object descriptor generating apparatus 100, the first feature extractor 110 extract features by applying extended curvature gabor filters having various curvatures to an input object image. Here, various extended curvature gabor filters may be used according to curvatures thereof. For example, a set of extended gabor filters and a set of extended curvature gabor filters having different curvatures may be used to extract different features. The first feature extractor 110 may also apply curvature gabor filters to an input object image by receiving optimal curvature gabor filter parameters extracted in a learning stage and filter application positions in the object image. The features and applications of the extended curvature gabor filters will be described below with reference to FIGS. 2 to 4.

The object descriptor generator 120 generates an object descriptor using the gabor features received from the first feature extractor 110. Specifically, the object descriptor generator 120 generates an object descriptor or an object feature vector by projecting the gabor features onto a base vector having a high classification rate. The object descriptor generator 120 may also generate an object descriptor using a base vector generated by the base vector generator 150. The base vector is generated through Linear Discriminant Analysis (LDA) learning of a gabor feature set generated by the selector 140.

The second feature extractor 130 extracts gabor features by applying extended curvature gabor filters to an object image stored in the object image database 160. Although the first and second feature extractors 110 and 130 perform different operations in the present embodiment for convenience of description, the above described functions may be performed by a single feature extractor.

The selector 140 selects efficient gabor features by performing boosting learning on the gabor features extracted by the second feature extractor 130 and establishes a gabor feature set including the selected gabor features. The gabor feature set includes a parameter and its applied position of a curvature gabor filter optimal to a specific object image. The selection of efficient gabor features is performed because the number of gabor filters applied throughout all areas of an image is too numerous. It will be understood that the boosting learning may be replaced with a statistical re-sampling algorithm. The boosting learning will be described below in detail with reference to FIG. 5.

The base vector generator 150 generates a base vector by performing LDC learning on the gabor feature set generated by the selector 140. The LDA learning will be described further below.

FIGS. 2(A) and 2(B) are views describing characteristics of extended curvature gabor filters according to an embodiment.

First, a conventional gabor filter, which is frequently used for object recognition or face recognition, is represented by the following Equation 1.

$$\psi(\bar{x}; v) = \frac{k_v^2}{\sigma^2} \exp\left(-\frac{k_v^2 \bar{x}^2}{2\sigma^2}\right) \left[\exp(ik_v x') - \exp\left(-\frac{\sigma^2}{2}\right)\right] \quad \text{Equation 1}$$

Here, "$k_v$" denotes the magnitude of the gabor filter and is represented by $$k_v = 2^{-\frac{v+2}{2}} \pi,$$

and $\sigma = 2\pi$. In this case, to provide the gabor filter with an angle according to an (x, y) increase, the following Equation 2 is used.

$$\bar{x} = \begin{pmatrix} x' \\ y' \end{pmatrix} = \begin{pmatrix} x\cos\varphi + y\sin\varphi \\ -x\sin\varphi + y\cos\varphi \end{pmatrix} \quad \text{Equation 2}$$

Here, an angle change according to the (x, y) increase follows $$\varphi_\mu = \mu \frac{\pi}{8},$$

and a total of 8 angles is used. The conventional gabor filter is further represented by the following Equation 3.

$$\psi(x, y; v, \mu) = \frac{k_v^2}{\sigma^2} \exp\left(-\frac{k_v^2(x^2 + y^2)}{2\sigma^2}\right) \quad \text{Equation 3}$$

$$\left[\exp(ik_v(x\cos\varphi_\mu + y\sin\varphi_\mu)) - \exp\left(-\frac{\sigma^2}{2}\right)\right]$$

The curvature gabor filter according to the present embodiment is formed to provide the gabor filter represented by Equation 3 with a curvature. The curvature gabor filter is further represented by the following Equation 4 as obtained by adding a curvature to Equation 2.

$$\bar{x} = \begin{pmatrix} x' \\ y' \end{pmatrix} \begin{pmatrix} x\cos\varphi + y\sin\varphi + c(-x\sin\varphi + y\cos\varphi^2) \\ -x\sin\varphi + y\cos\varphi \end{pmatrix} \quad \text{Equation 4}$$

Here, "c" denotes a curvature parameter. If the value of "c" increases, the curvature increases. If the value of "c" decreases, the curvature becomes similar to a straight line. Finally, if the value of "c" is zero, the curvature gabor filter has the same shape as the conventional gabor filter.

The curvature gabor filter, obtained by using Equations 1 and 4, may be defined by the following Equation 5.

$$\psi(x, y; v, \mu, c) = \qquad \text{Equation 5}$$

$$\frac{k_v^2}{\sigma^2} \exp\left(-\frac{k_v^2}{2\sigma^2}((x\cos\varphi_\mu + y\sin\varphi_\mu + c(-x\sin\varphi_\mu + y\cos\varphi_\mu)^2)^2 +\right.$$

$$\left.(-x\sin\varphi_\mu + y\cos\varphi_\mu)^2)\right)$$

$$\left[\exp\left(ik_v(x\cos\varphi_\mu + y\sin\varphi_\mu + c(-x\sin\varphi_\mu + y\cos\varphi_\mu)^2)\right) - \right.$$

$$\left. \exp\left(\frac{-\sigma^2}{2}\right)\right)\Big]$$

Here, values represented by $$k_v = 2^{-\frac{v+2}{2}}\pi, \ \sigma = 2\pi, \text{ and } \varphi_\mu = \mu\frac{\pi}{8}$$

are used.

FIG. 2(A) illustrates rear number portions of the extended gabor filters according to an embodiment, and FIG. 2(B) illustrates rear number portions of the curvature gabor filters. In the case of the gabor filters of FIG. 2(A), only magnitude and angle vary and small filters corresponding to v={−2, −1} are added to analyze a relative small image having a low resolution.

Since the extended curvature gabor filters according to an embodiment use angles in the range of 0° to 360°, twice as many as gabor filters are available as compared to the conventional gabor filters. Complexity in calculation, caused by an increase in the number of filters, may be removed by gabor feature selection using boosting learning, which will be described hereinafter. Even in the case of the extended curvature gabor filters, small filters corresponding to v={−2, −1} are added to analyze a relatively small image having a low resolution.

FIGS. 3(A) and 3(B) are views describing a group of extended curvature gabor filters according to an embodiment.

As illustrated in FIG. 3(A), in an embodiment, twelve (12) curvature gabor filters having three Gaussian magnitudes σ and four curvatures c are used to constitute a single group G (G={g(σ1, c1), g(σ2, c2), g(σ3, c3), g(σ4, c4), g(σ5, c5), . . . , g(σ12, c12)}). In the single group, the four curvatures c are 0.0, 0.05, 0.1 and 0.2 (c={0.0, 0.05, 0.1, 0.2}), and the three Gaussian magnitudes σ are 0.5π, π, 2π(σ={0.5π, π, 2π}). Each of the twelve (12) curvature gabor filters of the single group has eight (8) directivities as illustrated in FIG. 2(A) in the case of the curvature of zero (c={0, 0})(i.e. in the case of a straight line), and has sixteen (16) directivities (μ={0, 1, 2, . . . , 15}) as illustrated in FIG. 2(B) if the curvature is greater than the curvature of zero (c={0.0}) (i.e. in the case of a curved line). The twelve (12) curvature gabor filters are arranged in columns on the basis of the curvatures c, and are arranged in rows on the basis of the Gaussian magnitudes σ. Then, when using six (6) filters of the twelve (12) curvature gabor filters which are arranged in a T-shaped form as illustrated in FIG. 3(B), the amount of calculation may be remarkably reduced as compared to the case of using all the twelve (12) filters while achieving a face recognition rate of a predetermined level or more. The six (6) filters include three (3) filters having the Gaussian magnitudes σ={0.5π, π, 2π} at the curvature c={0.0}, and three (3) filters having the Gaussian magnitudes σ={π} at the curvature c={0.05, 0.1, 0.2}.

FIGS. 4(A) and 4(B) are views describing an example of applying extended curvature gabor filters to a facial image according to an embodiment.

FIG. 4(A) is a view obtained by applying conventional gabor filters to a facial image and FIG. 4(B) is a view obtained by applying the curvature gabor filters according to an embodiment to a facial image. An eye and an eyebrow portion 400 of the face are illustrated as being analyzed with a straight line pattern according to the conventional gabor filters as illustrated in FIG. 4(A), whereas referring to FIG. 4(B), an eye and eyebrow portion 440 are illustrated as being analyzed with a curved line pattern according to the extended curvature gabor filters. Similarly, a nose portion 410 and a chin portion 420 are illustrated as being analyzed with a straight line pattern according to the conventional gabor filters, whereas a nose portion 440 and a chip portion 450 are illustrated as being analyzed with a curved line pattern according to the extended curvature gabor filters. Since eyes, a nose, and a chin are essentially formed with curvilinear components, it has been found that curvature gabor filters may more accurately analyze features of these objects than the conventional linear gabor filters.

In an embodiment, an object may be analyzed by both considering linear components and curvilinear components of an object image and respectively applying curvature gabor filters having controllable curvatures to the curvilinear components, with optimal parameters and their positions being found and analyzed by combining the analysis results. The increase in complexity of calculation, caused by using twice as many filters as conventional gabor filters due to analyzing the angle change (i.e. directivity) up to 360°, may be solved by selecting optimal filters through the aforementioned boosting learning.

Figure 5:
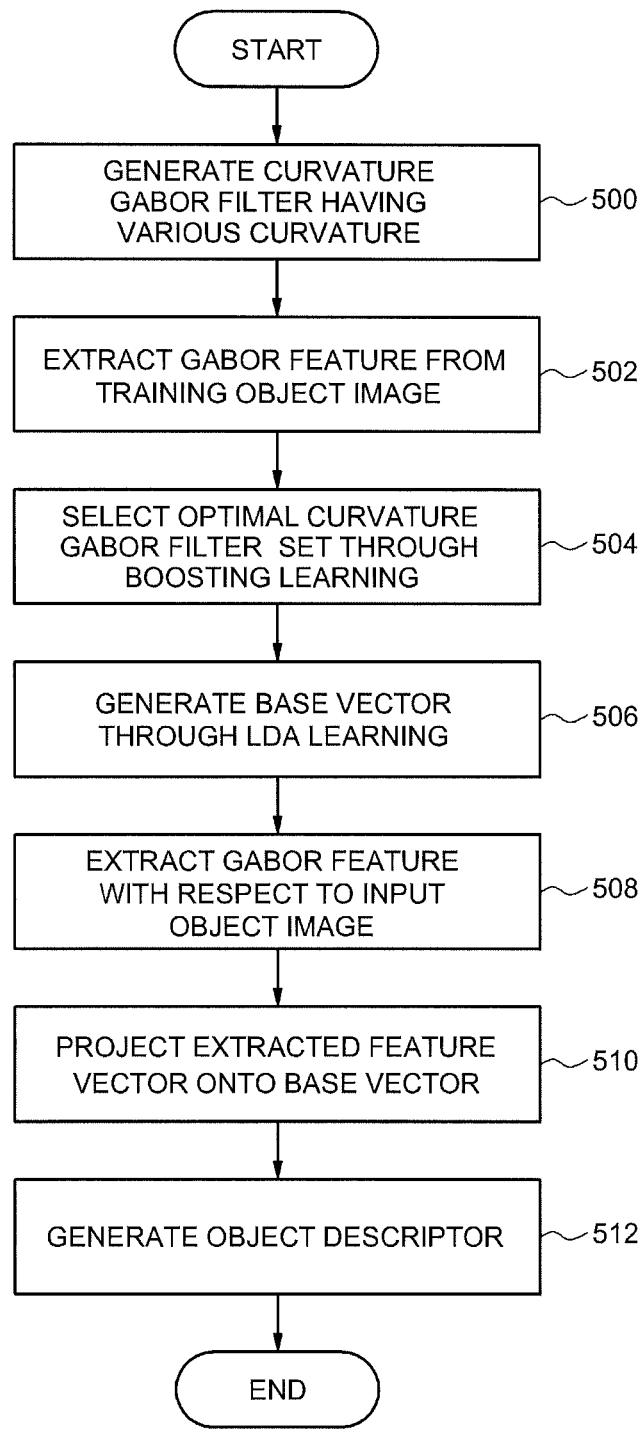
FIG. 5 is a view illustrating an object descriptor generating method according to an embodiment.

FIG. 5 is a view illustrating an object descriptor generating method according to an embodiment.

Referring to FIG. 5, the generation of an object descriptor may be generally divided into two processes. Operations 500 to 506 may be a training process, in which boosting is performed to find an optimal set of extended curvature gabor filters by extracting gabor features from an object image stored in a database and a base vector having a good classification rate is generated through the boosting. Operations 508 to 512 may be an object descriptor generating process, in which an object descriptor is generated by extracting gabor features from an input object image and projecting the extracted features (features vectors) onto the base vector. In the object descriptor generating process, features may be extracted from an input object image using optimal parameters and their positions of extended curvature gabor filters, which are found in the training process, and an object descriptor is generated by projecting the extracted features onto the base vector generated in the training process.

In operation 500, extended curvature gabor filters having various curvatures may be generated. Here, the extended curvature gabor filters may be represented by the above Equation 5. Thus, the curvature of the curvature gabor filter depends on the parameter c.

In operation 502, features may be extracted by applying the extended curvature gabor filters generated in operation 500 to a training object image.

Next, in operation 504, an optimal set of extended curvature gabor filters may be selected by performing the boosting learning with respect to the features extracted in operation 502.

As described above, the number of gabor filters applied to all areas of an object image may be too numerous and thus, is impossible to use all the gabor filters. When too many features are extracted, it is difficult to generate an optimal LDA base vector by comparing correlations between the gabor filter features, an optimal filter set may be found through adaboost in an embodiment. In this case, a boosting learning method, such as GentleBoost, RealBoost, KLBoost, or JSBoost, may be used. An object image recognition efficiency may be increased by selecting complementary gabor features from respective sub-sets using the boosting learning.

In an embodiment, the boosting learning may be performed under the assumption that one gabor filter, i.e. one parameter and its position are used. Since an adaboost algorithm is known, a detailed description thereof will be omitted herein. Such an adaboost algorithm is as follows:

begin initialize $D=\{x^1, y_1, \ldots, x^n, y_n\}$, $W_1(i)=1/n$, $i=1, \ldots, n$
$k \leftarrow 0$
do $k \leftarrow k+1$
   train weak learner $C_k$ using D sampled according to $W_k(i)$
   $E_k \leftarrow$ training error of $C_k$ measured on D using $W_k(i)$ $$a_k \leftarrow \frac{1}{2}\ln[(1-E_k)/E_k]$$

$$W_{k+1}(i) \leftarrow \frac{W_k(i)}{z_k} \times \begin{cases} e^{-a_k} & \text{if } h_k(x^i) = y_i \text{ (correctly classified)} \\ e^{a_k} & \text{if } h_k(x^i) \neq y_i \text{ (incorrectly classified)} \end{cases}$$

until $k=k_{max}$
return $C_k$ and $a_k$ for $k=1$ to $k_{max}$ (ensemble of classifiers with weights)
end The selected gabor filter set M ($M=\{(m, n)$ I selected features by boosting\}) may be represented using the position and parameter by the following Equation 6.

$$y_{m,n} = r(x, y) + ji(x, y) \qquad \text{Equation 6}$$
$$= I(x+m, y+n) \cdot \psi(x, y; v, \mu, c) \ldots 0 \leq x, y \leq G$$

Here, "G" denotes the magnitude of a gabor filter. An applied value of the gabor filter may be divided into a rear number portion and an imaginary number portion. Magnitude information and phase information may be extracted by using the following Equation 7.

$$mag(x, y) = \sqrt{r(x, y)^2 + i(x, y)^2} \qquad \text{Equation 7}$$
$$pha(x, y) = \tan^{-1}\frac{r(x, y)}{i(x, y)}$$

The extracted magnitude information and phase information may be used as a feature vector of an object. Since the magnitude may robustly withstand image transformation, the magnitude information may be used. In addition, since the phase information represents complementary features with the magnitude, the phase information may be selectively used with the magnitude information.

In operation 506, a base vector is generated through the LDA learning using the selected gabor filter feature set. That is, a feature vector generated using Equations 6 and 7 is projected onto a base vector optimizing classification. Here, the LDA technique is a technique of linearly projecting data onto a sub-space which reduces within-class scatter and maximizes between-class scatter. The LDA base vector generated in operation 506 may be a representative characteristic value of an object recognition set and may be efficiently used for object recognition of the set. The LDA base vector may be calculated through the following process.

The LDA may use a ratio of a Within-Scatter-Matrix $S_W$ to a Between-Scatter-Matrix $S_B$, and may be represented by the following Equation 8.

$$S_W = \sum_{i=1}^{m}\sum_{x \in X_i}(x - \bar{x}_i)(x - \bar{x}_i)^T \qquad \text{Equation 8}$$

$$S_B = \sum_{i=1}^{m} N_i(\bar{x}_i - \bar{x})(\bar{x}_i - \bar{x})^T$$

The calculated scatter matrices may generate a base vector, which minimizes dispersion of the Within-Scatter-Matrix $S_W$ and maximizes dispersion of the Between-Scatter-Matrix $S_B$, by using the following Equation 9.

$$\Phi_{opt} = \arg\max_{\Phi} \frac{|\Phi^T S_B \Phi|}{|\Phi^T S_W \Phi|} = [\phi_1 \; \phi_2 \; \ldots \; \phi_k] \qquad \text{Equation 9}$$

Here, $\Phi_{opt}$ represents an LDA base vector.

In operation 508, gabor features with respect to an input object image are extracted. More particularly, the gabor features may be extracted by using the parameters and positions of the curvature gabor filters selected in operation 504. In operation 510, the extracted features (feature vectors) are projected onto a base vector. The extracted features may be projected onto the base vector generated in operation 506. In operation 512, an object descriptor may be generated. If it is assumed that the magnitude vector extracted from the above-described Equation 7 is "m", the vector projection expression, i.e. the following Equation 10 may be used.

$$y = \Phi^T(m - m_{mean}) \qquad \text{Equation 10}$$

Here, the vector "y" becomes the final feature of the object, and this feature vector may act as a general gabor feature vector or a curvature gabor feature vector because the filter operation may be controlled to act as the general gabor filter or the curvature gabor filter based on the filter parameter c. The projected vector "y" is a final object descriptor.

Figure 6:
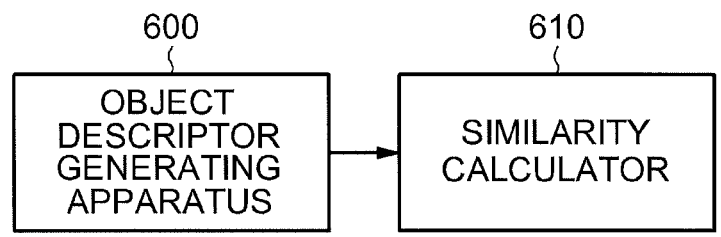
FIG. 6 is a view illustrating an object recognition system using the object descriptor generating apparatus illustrated in FIG. 1.

FIG. 6 is a view illustrating an object recognition system using the object descriptor generating apparatus illustrated in FIG. 1.

Referring to FIG. 6, the object recognition system includes an object descriptor generating apparatus 600 and a similarity calculator 610. The object descriptor generating apparatus 600 generates an objector descriptor according to the object descriptor generating method described with reference to FIG. 5, and provides the generated object descriptor to the similarity calculator 610. The similarity calculator 610 further calculates similarity with a feature vector of an arbitrary target image using the object descriptor Y generated using Equation 10, and determines whether or not the two objects are the same.

In an embodiment, the similarity calculation is performed using Weighted Normalized Correlation such as the following Equation 11.

$$Y_i[y_{ig}, y_{ib_1}, y_{ib_2}, y_{ib_3}]$$ Equation 11

$$S(Y_i, Y_j) =$$

$$w_1 \frac{y_{ig} \cdot y_{jg}}{\|y_{ig}\| \cdot \|y_{jg}\|} + \sum_{k=2}^{4} w_k \cdot \left( \frac{y_{ib_k} \cdot y_{jb_k}}{\|y_{ib_k}\| \cdot \|y_{jb_k}\|} \right) \ldots \sum_{k=1}^{4} w_k = 1$$

The obtained similarity has a value between −4 and 4. An input object is determined to be different from the other object if the similarity value is −4, and is determined to be fully identical to the other object if the similarity value is 4. In addition, a specific threshold may be set and an input object may be recognized as the same as the other object if the similarity value is greater than the specific threshold.

FIG. 7 is a view illustrating an object descriptor generating sequence when using extended curvature gabor filters having various curvatures according to an embodiment.

Referring to FIG. 7, extended curvature gabor filters (see FIG. 3) having various curvatures are generated (710), and gabor features are extracted from a training object image by applying the gabor filters to the training object image. Next, a feature set including optimal positions and filter parameters is selected through the boosting learning (720). Selected gabor features are extracted by applying the selected feature set to an input object image (730). Next, each of the extracted gabor features is projected onto a base vector generated through the LDA learning (740). An object descriptor is generated by synthesizing the projection results (750).

The embodiments can be implemented in computing hardware and/or software, such as (in a non-limiting example) any computer that can store, retrieve, process and/or output data and/or communicate with other computers. The computing hardware may include a processor for performing operations. The results produced may be displayed on a display of the computing hardware. For example, the apparatus in FIG. 1 may be implemented via computing hardware and software.

In addition, the above described embodiments may be implemented via a computer readable code in a computer readable recording medium executable by a computer.

The computer readable recording medium includes all kinds of recording devices in which data that may be read by a computer system is stored.

Examples of the computer readable recording medium include ROM, RAM, CD-ROM, magnetic tape, floppy disk and an optical data storage device, although a computer readable recording medium is not limited to these examples. The computer readable recording medium may be connected to a computer system via a network and may store and execute the computer readable code in a distributed manner. Programmers skilled in the art will easily reason functional programs, codes, and code segments to realize embodiments.

As is apparent from the above description, according to embodiments, a recognition rate of even a relatively small image may be increased with use of an extended number of curvature gabor filters having controllable curvatures. Further, the amount of calculation required for face recognition may be reduced by performing the face recognition using only some of the extended curvature gabor filters which have a great effect on the recognition rate. Accordingly, it may be possible to achieve a face recognition system to be easily mounted in a portable appliance, such as a mobile phone or a camera.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of generating an object descriptor, comprising:
    extracting, by a computer, gabor features from an input object image by applying a plurality of curvature gabor filters, generated via combination of a plurality of curvatures and a plurality of Gaussian magnitudes so that each curvature gabor filter of the plurality of curvature gabor filters has a different combination of curvature and Gaussian magnitude than the other curvature gabor filters of the plurality of curvature gabor filters, to the object image; and
    generating, by a computer, an object descriptor for object recognition by projecting the extracted features onto a predetermined base vector.

2. The method according to claim 1, wherein:
    the curvatures are in the range of a value equal to or greater than about 0.0 to a value equal to or less than about 0.2; and
    the Gaussian magnitudes are in the range of a value equal to or greater than about $0.5\pi$ to a value equal to or less than about $2\pi$.

3. The method according to claim 2, wherein:
    the curvatures are represented by c={0.0, 0.05, 0.1, 0.2}; and
    the Gaussian magnitudes are represented by $\sigma$={$0.5\pi$, $\pi$, $2\pi$}.

4. The method according to claim 3, wherein, when the plurality of gabor filters are arranged in columns on the basis of the curvatures and in rows on the basis of the Gaussian magnitudes, the gabor features are extracted using some of the gabor filters which are arranged in a T-shaped form.

5. The method according to claim 4, wherein the filters arranged in a T-shaped form include:
    filters having the Gaussian magnitude $\sigma$={$0.5\pi$, $\pi$, $2\pi$} based on the curvature c={0.0}; and
    filters having the Gaussian magnitude $\sigma$={$\pi$} based on the curvature c={0.05, 0.1, 0.2}.

6. The method according to claim 1, further comprising:
    extracting gabor features from a training object image by applying the curvature gabor filters to the training object image; and
    selecting gabor features by performing boosting learning for object image classification with respect to the extracted gabor features, and establishing a gabor feature set including the selected gabor features,
    wherein the extraction of the gabor features includes extracting gabor features by applying curvature gabor filters having the established gabor feature set to the input object image.

7. The method according to claim 6, further comprising generating a base vector by performing linear discriminant analysis of the established gabor feature set,
    wherein the generation of the object descriptor includes generating an object descriptor for object recognition by projecting the extracted gabor features onto the generated base vector.

8. A method of generating an object descriptor, comprising:
    extracting, by a computer, first gabor features from a training object image by applying curvature gabor filters to the training object image;
    selecting gabor features by performing boosting learning for object image classification with respect to the extracted gabor features and establishing a gabor feature set including the selected gabor features;

generating, by a computer, a base vector by performing linear discriminant analysis of the established gabor feature set;

extracting, by a computer, second gabor features from an input object image by applying a plurality of curvature gabor filters, generated via combination of a plurality of curvatures and a plurality of Gaussian magnitudes among the established gabor feature set so that each curvature gabor filter of the plurality of curvature gabor filters has a different combination of curvature and Gaussian magnitude than the other curvature gabor filters of the plurality of curvature gabor filters, to the input object image; and generating, by a computer, an object descriptor for object recognition by projecting the extracted second gabor features onto the generated base vector.

9. The method according to claim 8, wherein:
the curvatures are in the range of a value equal to or greater than about 0.0 to a value equal to or less than about 0.2; and
the Gaussian magnitudes are in the range of a value equal to or greater than about $0.5\pi$ to a value equal to or less than about $2\pi$.

10. The method according to claim 9, wherein:
the curvatures are represented by c={0.0, 0.05, 0.1, 0.2}; and
the Gaussian magnitudes are represented by $\sigma$={$0.5\pi$, $\pi$, $2\pi$}.

11. The method according to claim 10, wherein, when the plurality of gabor filters are arranged in columns on the basis of the curvatures and in rows on the basis of the Gaussian magnitudes, the gabor features are extracted using some of the gabor filters which are arranged in a T-shaped form.

12. The method according to claim 11, wherein the filters arranged in a T-shaped form include:
filters having the Gaussian magnitude $\sigma$={0.0, 0.05, 0.1, 0.2} based on the curvature c={0.0}; and
filters having the Gaussian magnitude $\sigma$={$\pi$} based on the curvature c={0.05, 0.1, 0.2}.

13. An apparatus of generating an object descriptor, comprising:
a first feature extractor to extract gabor features from an input object image by applying a plurality of curvature gabor filters, generated via combination of a plurality of curvatures and a plurality of Gaussian magnitudes so that each curvature gabor filter of the plurality of curvature gabor filters has a different combination of curvature and Gaussian magnitude than the other curvature gabor filters of the plurality of curvature gabor filters, to the object image; and
an object descriptor generator to generate an object descriptor for object recognition by projecting the extracted features onto a predetermined base vector.

14. The apparatus according to claim 13, wherein:
the curvatures are in the range of a value equal to or greater than about 0.0 to a value equal to or less than about 0.2; and
the Gaussian magnitudes are in the range of a value equal to or greater than about $0.5\pi$ to a value equal to or less than about $2\pi$.

15. The apparatus according to claim 14, wherein:
the curvatures are represented by c={0.0, 0.05, 0.1, 0.2}; and
the Gaussian magnitudes are represented by $\sigma$={$0.5\pi$, $\pi$, $2\pi$}.

16. The apparatus according to claim 15, wherein, when the plurality of gabor filters are arranged in columns on the basis of the curvatures and in rows on the basis of the Gaussian magnitudes, the gabor features are extracted using some of the gabor filters which are arranged in a T-shaped form.

17. The apparatus according to claim 16, wherein the filters arranged in a T-shaped form include:
filters having the Gaussian magnitude $\sigma$={$0.5\pi$, $\pi$, $2\pi$} based on the curvature c={0.0}; and
filters having the Gaussian magnitude $\sigma$={$\pi$} based on the curvature c={0.05, 0.1, 0.2}.

18. The apparatus according to claim 13, further comprising:
a second feature extractor to extract gabor features from a training object image by applying the curvature gabor filters to the training object image; and
a selector to select gabor features by performing boosting learning for object image classification with respect to the gabor features extracted from the second feature extractor and to establish a gabor feature set including the selected gabor features,
wherein the first feature extractor extracts gabor features by applying curvature gabor filters having the established gabor feature set to the input object image.

19. The apparatus according to claim 18, further comprising generating a base vector generator to generate a base vector by performing linear discriminant analysis of the established gabor feature set,
wherein the object descriptor generator generates an object descriptor for object recognition by projecting the gabor features, extracted from the first feature extractor, onto the generated base vector.

* * * * *